UNITED STATES PATENT OFFICE.

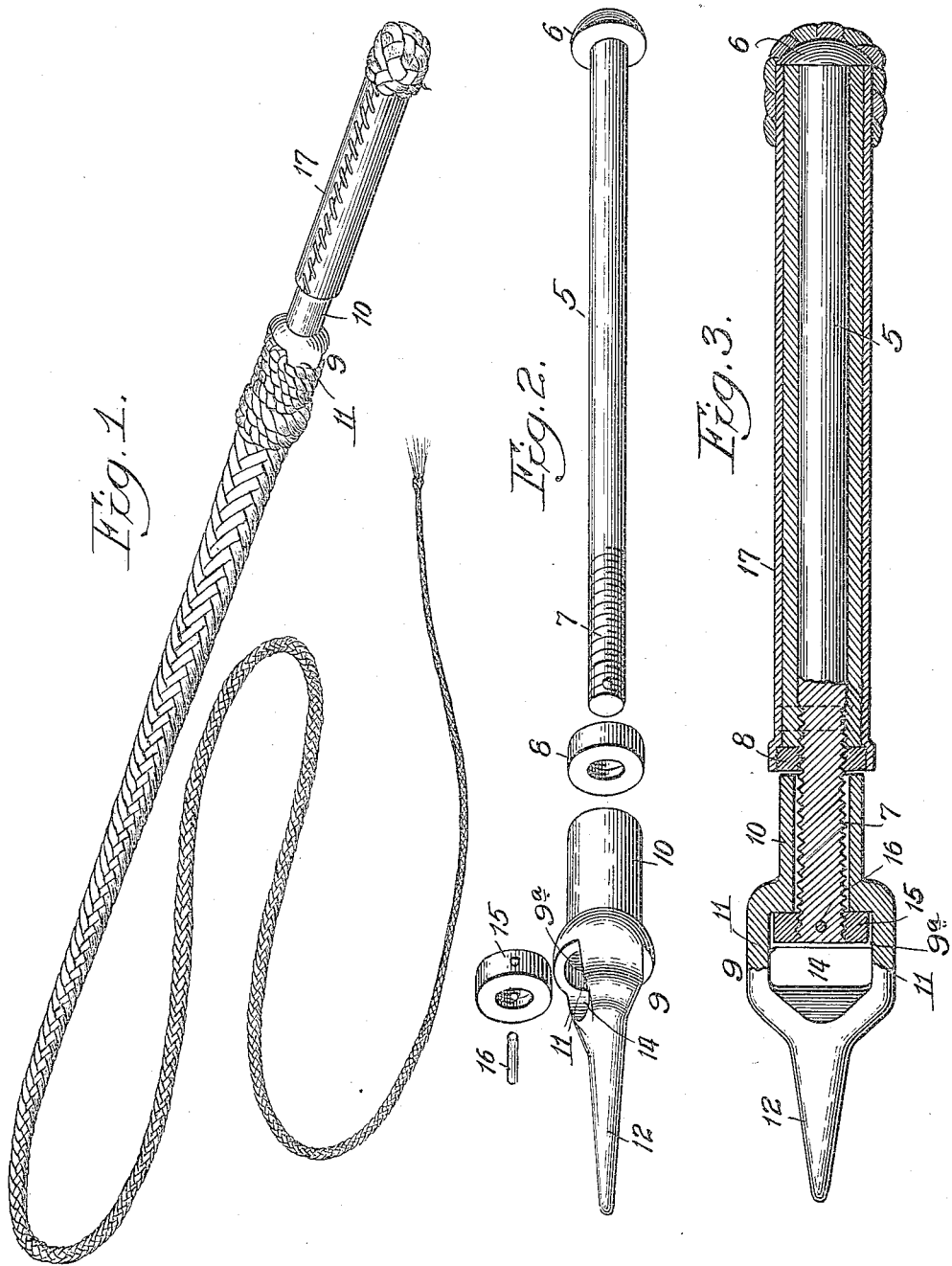

AUGUST J. SCHMIDT, OF CHICAGO, ILLINOIS, ASSIGNOR TO DIAMOND WHIP COMPANY, OF CHICAGO, ILLINOIS, A CORPORATION OF ILLINOIS.

WHIP.

1,151,620. Specification of Letters Patent. Patented Aug. 31, 1915.

Application filed May 19, 1915. Serial No. 29,031.

*To all whom it may concern:*

Be it known that I, AUGUST J. SCHMIDT, a resident of Chicago, in the county of Cook and State of Illinois, have invented certain new and useful Improvements in Whips, of which the following is a full, clear, and exact description.

The invention relates to whips and more particularly to the type exemplified in Letters Patent No. 931,047, in which there is a rotatable connection between the part to which the whip-lash is secured and the handle, so that the whip-lash will be free to rotate while it is being swung or "cracked." In the practice of the invention set forth in said Letters Patent, it has been found desirable to provide a construction in which the rotatable head is formed in a single piece to avoid the necessity of forming it in two pieces, as set forth in said patent, because they sometimes become loose or disarranged.

The object of the invention is to provide an improved construction of whip in which the rotatable head, to which the whip-lash is secured, is formed in a single piece and which may be conveniently assembled.

The invention consists in the several novel features hereinafter set forth and more particularly defined by claims at the conclusion hereof.

In the drawings: Figure 1 is a perspective of a whip embodying the invention. Fig. 2 is a perspective of the several parts in separated relation. Fig. 3 is a longitudinal section, the lash being omitted.

The improved whip-handle comprises a metallic stem or rod 5 provided with an integral head 6 at its outer end and a screw-thread 7 at its inner end. A collar 8, threaded to engage the screw-thread 7, is adapted to serve as an adjustable head or shoulder for the outer end of a rotatable head 9. This head comprises a sleeve-portion 10 adapted to fit around the screw-threaded portion 7, arms 11 integral with said sleeve-portion, and a point 12. Openings 14 are formed in the head between the arms 11. A collar 15 is adapted to be inserted laterally into the head through openings 14, and is screw-threaded to engage the screw-threaded terminal of the stem 5. This collar 15 serves to hold the head 9 against inward movement on the stem, so that the sleeve portion will be rotatable but confined against longitudinal movement by the collars 8 and 15.

In assembling the device, the collar 8 is first turned into position indicated by dotted lines in Fig. 3. Next, the head is placed around the screw-threaded portion of the stem. Collar 15 is then slipped into the head through one of the openings 14 and by reason of the retracted position of the collar 8, the stem 5 may be turned into the collar 15, while the latter is held through the openings 14. When collar 15 has been turned sufficiently to provide the proper connection between it and the stem, a lock-pin 16 is driven into holes provided in the terminal on the stem and collar 15, the openings 14 permitting this to be done. Next, the collar 8 is turned to move inward and longitudinally into a position adjacent the outer end of sleeve-portion 10 of head 9, so that the head will be rotatable, but confined against substantially longitudinal movement on the stem. The collar 8 and the stem 5 are then covered, as at 17, with leather or other suitable material, and this covering is tightly wrapped around the stem and around collar 8, so that the latter will be secured against rotation on the stem. The whip-lash is then braided around the point 12 and through openings 14 in the head 9, as well understood in the art. When the whip has been thus assembled, the collar 15 will be disposed and secured in a socket 9ª which is formed in the head and between the sleeve-portion 10 and openings 14.

The invention thus exemplifies an improved whip comprising a rotatable one-piece head, to which the lash is secured, and which can be conveniently assembled and produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a whip, the combination of a handle-stem, a collar movable longitudinally on the stem from the inner end thereof, a one-piece rotatable head having a transverse opening, a point and a sleeve-portion rotatable around the stem, a collar at the inner end of the stem and insertible into the head through said transverse opening, said sleeve-portion being rotatably confined between said collars, and a whip-lash attached to the head.

2. In a whip, the combination of a handle-stem, a collar screw-threaded to the stem from the inner end thereof, a covering for the stem, a one-piece rotatable head having a transverse opening, a point and a sleeve-portion rotatable around the stem, a collar screw-threaded to the inner end of the stem and insertible into the head through said transverse opening, said sleeve-portion being rotatably confined between said collars, and a whip-lash attached to the head.

3. In a whip, the combination of a handle-stem, a collar movable longitudinally onto the stem from the inner end thereof, a one-piece rotatable head having a transverse opening, a point and a sleeve-portion rotatable around the stem, a collar at the inner end of the stem insertible into the head through said transverse opening, said sleeve-portion being rotatably confined between said collars and a whip-lash attached to the head, the first-mentioned collar being movable outwardly on the stem to permit the stem to be connected to the other collar when the latter is held through said transverse opening in assembling the parts.

4. In a whip, the combination of a handle-stem, a collar movable longitudinally onto the stem from the inner end thereof, a one-piece rotatable head having a socket therein, a point and a sleeve-portion rotatable around the stem, a collar screw-threaded on the inner end of the stem and disposed in said socket, said sleeve-portion being rotatably confined between said collars, a whip-lash attached to the head, and a covering for the stem.

5. In a whip, the combination of a handle-stem, a pair of spaced collars screw-threaded to the stem, a one-piece rotatable head having a transverse opening, a point and a sleeve-portion rotatable around the stem, and rotatably confined between said collars, a whip-lash attached to the head, and a covering for the stem, extending over one of the collars to secure it against rotation on the stem.

AUGUST J. SCHMIDT.

Witnesses:
MILDRED STUMPF,
KATHARINE GERLACH.

Copies of this patent may be obtained for five cents each, by addressing the "Commissioner of Patents, Washington, D. C."